Sept. 14, 1954        E. W. CLARKE        2,689,173
PROCESS OF TREATING SOIL
Filed Jan. 24, 1952        3 Sheets-Sheet 1
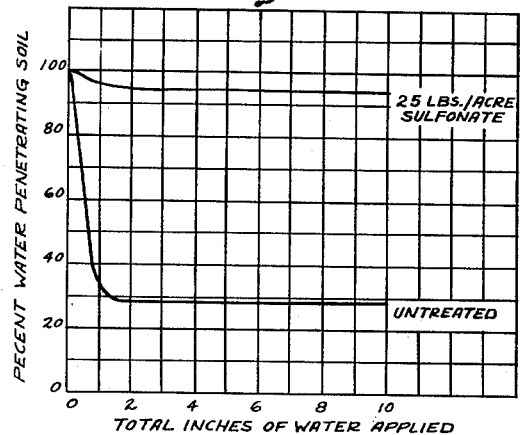
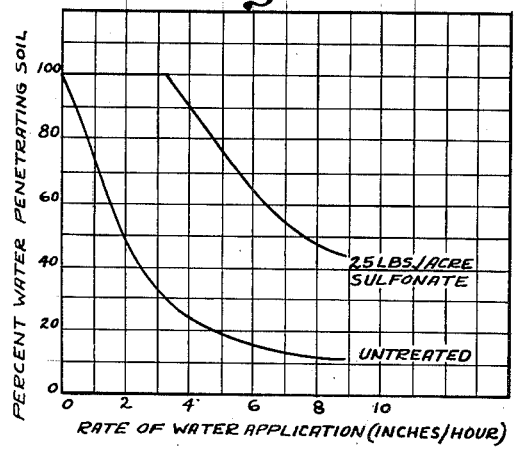
ATTEST:
INVENTOR.
EDGAR W. CLARKE,
BY
ATTORNEY Sept. 14, 1954  E. W. CLARKE  2,689,173
PROCESS OF TREATING SOIL
Filed Jan. 24, 1952  3 Sheets-Sheet 2
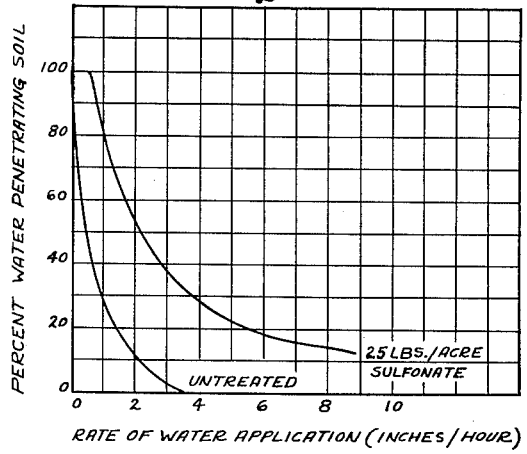
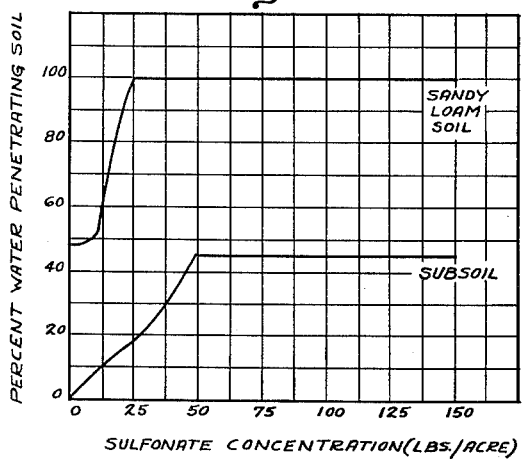
ATTEST:
Melvin C. Flint
INVENTOR.
EDGAR W. CLARKE,
BY Norbert E. Birch
ATTORNEY Sept. 14, 1954        E. W. CLARKE        2,689,173
PROCESS OF TREATING SOIL
Filed Jan. 24, 1952        3 Sheets-Sheet 3
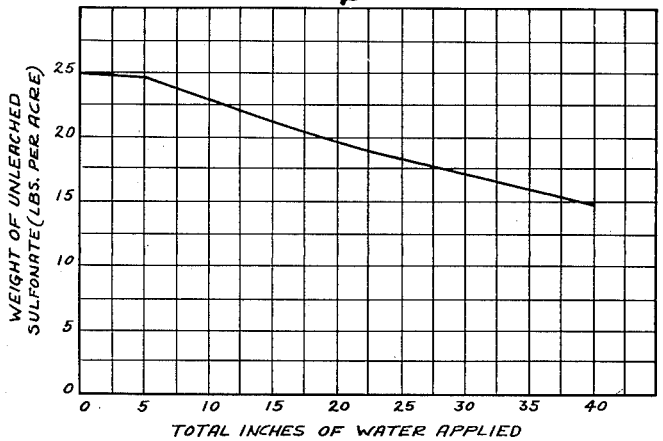
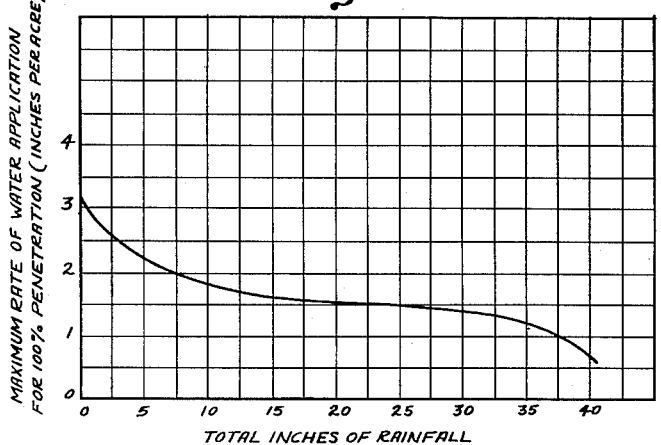
ATTEST:        INVENTOR.
EDGAR W. CLARKE,
BY
ATTORNEY Patented Sept. 14, 1954

2,689,173

UNITED STATES PATENT OFFICE 2,689,173

PROCESS OF TREATING SOIL

Edgar W. Clarke, Laurel Springs, N. J., assignor to The Atlantic Refining Company, Philadelphia, Pa., a corporation of Pennsylvania Application January 24, 1952, Serial No. 268,110

10 Claims. (Cl. 71—1)

This invention relates to soil treatment and, more particularly, to a process for treating soil with alkyl benzene sulfonates, thereby to obtain such desirable results as stimulation of the growth of vegetation including both earlier and more complete germination of seed, and reduction of soil erosion caused by heavy rainfall or flash floods.

This application is a continuation-in-part of my copending application, Serial No. 142,933, filed February 7, 1950, now abandoned.

Briefly, the present invention comprehends a process involving the application of certain alkyl benzene sulfonates to soil to bring moisture, and incidentally nutrients, to the roots of any vegetation growing in the soil, thereby to increase the rate of growth of such vegetation; to increase the rate and extent of penetration of the soil by water, thereby to reduce or eliminate substantially erosion of soil normally caused by heavy rainfall or flash floods; and to increase the water retention characteristics of soil, whereby the benefaction of soil, particularly in arid regions, by rain may be extended over a relatively long period of time.

It is recognized that soils have been treated in the past with mixtures of plant nutrients and certain materials as alkanolamines, including mono-, di-, and triethanolamine; as aliphatic diamines including ethylenediamine and diaminoisopropanol; alkyl monoamines including triethylamine; and other so-called "surface-depressing" agents, including sulfonated pine oil, sulfonated naphthenic acids, and sulfonated vegetable oils. While such mixtures of plant nutrients and so-called "surface-depressing" agents may be effective to stimulate growth of vegetation, by treatment, in accordance with this invention, of soil with certain alkyl benzene sulfonates, very spectacular and unexpected results are realized. Not only does such process effect phenomenal plant stimulation but, in addition, its use in arid lands reduces or eliminates substantially soil erosion due to heavy rainfall, flash floods, and the like. The differences between the heretofore known processes of applying nutrient solutions containing "surface-depressing" agents to plants and the process of the present invention of applying certain alkyl benzene sulfonates to soil are more than simply differences in degree and in fact constitute differences in kind.

The novel and unexpected results obtained by my process are believed to be due to the characteristics of the alkyl benzene sulfonates of lowering the surface tension of water more than 25 dynes/cm. (as measured by the du Nuoy tensiometer) at 25° C. in water of 300 p. p. m. hardness and at a concentration of 0.001%. In contrast to the alkyl benzene sulfonates of the present invention, under identical conditions none of those heretofore known "surface-depressing" materials, above mentioned, lowers the surface tension of water more than 5 dynes/cm.

I have found that very dilute aqueous solutions of the alkyl benzene sulfonates may be very effectively used in irrigating or watering humus-deficient soils to improve the contact between water-soluble constituents of natural or commercial fertilizers and the roots of vegetation such as trees, shrubs, vegetables, plants, flowers and grasses. The alkyl benzene sulfonate apparently assists water in thoroughly wetting particles of dry soil, the root hairs, and the water-soluble particles of nutrient or fertilizer which are essential for active growth, and provides an efficient and economic method of transfer of nutrients from soil to the roots.

When the upper ten inches of a soil are composed almost entirely of compost or decayed organic matter, the soil appears to contain natural surface active agents and does not require the process of the present invention to stimulate growth of vegetation. For large scale grazing or farming operations, however, the production of such a humus-rich soil from arid or semi-arid soil is seldom feasible. Ordinary soils appear greatly deficient in humus and a great excess of water is required even to partially wet the soil to a depth of several inches. The excess water appears to carry away the water-soluble nutrients through run off, and the resultant vegetation is weak and easily diseased due to lack of sufficient nourishment. However, this difficulty may be largely overcome in accordance with the present invention by irrigating or watering the soil with dilute aqueous solutions containing less than 2% of an alkyl benzene sulfonate. In general, concentrations of 0.001% to 0.04% are sufficient to accomplish the desired result, and concentrations up to about 0.15% may be employed where the water is applied by spraying, without causing burning of the foliage. Concentrations higher than 0.15%, for example, up to 2% where necessary should be applied directly to soil at the base of plants, flowers, shrubs and trees, and in the case of grasses and most vegetables, by conventional irrigation sluices. Alternately, dry alkyl benzene sulfonates may be incorporated directly into the soil and in such case they become active when water contacts the soil.

I have also found that the application of the alkyl benzene sulfonates to arid or semi-arid soil produces the result that large quantities of water applied to the soil, such as during a heavy rainfall which occasionally occurs in such areas, will penetrate the soil, thus substantially reducing water flow over the area with resulting decrease or elimination of soil erosion. Further, the water penetrating the soil is more strongly retained therein, thereby prolonging the beneficial application of water to the soil with the result that heretofore useless arid and semi-arid land may become satisfactory for commercial crop growing.

In arid and semi-arid soil areas rain obviously occurs only occasionally but when it does it is usually quite heavy and of short duration. The water penetrates the soil to some extent but the rate of rainfall is so great that most of it flows off resulting in soil erosion. While the rate and extent of water penetration of soil depends somewhat on the nature of the soil such, for example, as sub-soil, sandy, etc., such water penetration can be greatly enhanced regardless of the type of soil, by applying to the soil the alkyl benzene sulfonates. The optimum concentration (lbs./acre) of the sulfonate varies over a wide range and is dependent upon the type of soil, the maximum rate of rainfall, the desired minimum per cent water penetration, and various other factors. In order to realize any substantial benefit from the process of the invention for this purpose, it is usually necessary to apply at least 10 pounds of the sulfonate per acre and preferably from 15 to 50 pounds per acre.

A single treatment of soil with relatively a high molecular weight alkyl benzene sulfonate is usually effective for a period of about one year but the effective time is dependent upon the total amount of water applied to the treated soil, and in some cases it may be desirable to shorten or lengthen the time between treatments. The lower molecular weight alkyl benzene sulfonates are much more soluble in water, and an application of a mixture of a minor portion of such a sulfonate or sulfonates with a high molecular weight sulfonate will be leached out more rapidly, thereby resulting in a shorter effective period.

It has been found that vegetation irrigated or watered in the presence of these alkyl benzene sulfonates requires only about one-third as much water to prevent wilting as would normally be required with water alone. This offers the possibility that vast arid areas of unproductive and highly alkaline soils could be converted into grazing or farming land through frugal irrigation employing small concentrations of alkyl benzene sulfonates which decompose eventually into products which acidify the soil.

The alkyl benzene sulfonates which may be employed in accordance with this invention include di- and trialkyl benzene sulfonates having an alkyl group of at least 5 carbon atoms, and monoalkyl benzene sulfonates in which the alkyl group contains at least 9 carbon atoms and preferably 9 to 15 carbon atoms. Specific examples are the sulfonates of nonyl benzene, nonyl propyl benzene, nonyl dimethyl benzene, nonyl diethyl benzene, nonyl methyl ethyl benzene, nonyl methyl propyl benzene, nonyl ethyl propyl benzene, nonyl dipropyl benzene, decyl benzene, decyl toluene, decyl ethyl benzene, decyl propyl benzene, decyl dimethyl benzene, decyl diethyl benzene, decyl methyl ethyl benzene, decyl methyl propyl benzene, decyl ethyl propyl benzene, decyl dipropyl benzene, undecyl benzene, undecyl toluene, undecyl ethyl benzene, undecyl dimethyl benzene, undecyl diethyl benzene, undecyl methyl ethyl benzene, undecyl methyl propyl benzene, undecyl dipropyl benzene, dodecyl benzene, dodecyl toluene, dodecyl ethyl benzene, dodecyl propyl benzene, dodecyl dimethyl benzene, dodecyl diethyl benzene, dodecyl methyl ethyl benzene, dodecyl methyl propyl benzene, dodecyl dipropyl benzene, tridecyl benzene, tridecyl toluene, tridecyl ethyl benzene, tridecyl propyl benzene, tridecyl dimethyl benzene, tridecyl diethyl benzene, tridecyl methyl ethyl benzene, tridecyl methyl propyl benzene, tridecyl dipropyl benzene, tetradecyl benzene, tetradecyl toluene, tetradecyl ethyl benzene, tetradecyl propyl benzene, tetradecyl dimethyl benzene, tetradecyl diethyl benzene, tetradecyl methyl ethyl benzene, tetradecyl methyl propyl benzene, tetradecyl dipropyl benzene, pentadecyl benzene, pentadecyl toluene, pentadecyl ethyl benzene, pentadecyl propyl benzene, pentadecyl dimethyl benzene, pentadecyl diethyl benzene, pentadecyl methyl ethyl benzene, pentadecyl methyl propyl benzene, and pentadecyl dipropyl benzene, or mixtures thereof; or such sulfonates and mixtures thereof together with a minor proportion of a low molecular weight di- or trialkyl benzene sulfonate, such as xylene, methyl ethyl benzene, methyl propyl benzene, diethylbenzene, ethyl propyl benzene, trimethyl benzene, methyl diethyl benzene, methyl ethyl propyl benzene, and triethyl benzene.

The present invention may be further illustrated by the following examples, which, however, are not to be construed as limiting the scope thereof. In these examples, a commercially available alkyl benzene sulfonate was employed, such agent having been produced by polymerizing a gaseous mixture containing predominantly propylene (80%) with minor amounts of propane and lower boiling hydrocarbons, using a supported phosphoric acid catalyst at 500° F. and 400 lbs./sq. in. pressure, to obtain a mixture of propylene polymers from which was separated by fractional distillation, a fraction averaging 12 carbon atoms per molecule. This fraction was then employed to alkylate benzene, using AlCl$_3$ as a catalyst at 150° F. The resulting mixture of alkylated benzenes was distilled to recover a fraction averaging 12 carbon atoms in the alkyl group (the fraction actually contained minor amounts of C$_9$ to C$_{15}$ alkyl benzenes). This fraction, upon sulfonation with 98% sulfuric acid at 160° F. yielded the corresponding alkyl benzene sulfonic acids, which, after separation from the spent sulfuric acid, were neutralized with sodium hydroxide and recovered as essentially sodium dodecyl benzene sulfonates containing a small amount of inorganic salts, i. e., sodium sulfate. It is to be understood, however, that the invention is not restricted to the use of the sodium alkyl benzene sulfonates, but contemplates other water soluble salts of the alkyl benzene sulfonates such as the potassium, calcium, magnesium, ammonium, and substituted ammonium, e. g., triethanolammonium, diethanolammonium, and tetramethylammonium.

The general procedure for manufacturing sulfonates of this type is described in various United States patents, including U. S. Nos. 1,992,160; 2,232,118; 2,430,673; 2,477,372; and 2,477,383, and does not constitute any part of the present invention.

The essentially C$_{12}$ alkyl benzene sodium sulfonate was employed as follows:

EXAMPLE I

A strip of grass 10 feet long by 2 feet wide constituted a part of a larger area which had been sun-scorched almost to a brown color by the hot summer sun. The test strip was treated with water containing 0.02% by weight of the sulfonate, i. e., $C_{12}$ alkyl benzene sodium sulfonate, while the remainder of the larger area received an equivalent amount of water without any sulfonate. The test strip turned green and remained green for over a week, while the remainder of the larger area did not recover but remained sun-scorched.

EXAMPLE II

The weekly addition of water containing 0.02% by weight of the same sulfonate to a variety of flowering shrubs imparted increased resistance to autumn frosts. This was undoubtedly caused by a general increase in plant vitality due to increased consumption of water-soluble soil nutrients. Thus, the leaves of flowering shrubs remained green until late November, while the leaves of similar shrubs, treated with water without the sulfonate, were entirely lost at that time.

EXAMPLE III 18 fruit trees, including apple trees, peach trees, cherry trees, plum trees, and pear trees all gave forth new growth, averaging 2 inches in length within 48 hours following one treatment with water containing 0.02% by weight of the same sulfonate. The rate of growth of previous shoots averaged 2 inches per week, and no new shoots had appeared for two weeks prior to the test despite daily watering with water containing no sulfonate. 2 trees, watered with water containing no sulfonate, gave now new growth during the test period.

EXAMPLE IV 2 dwarf apple trees grew between May and September from 20 inches in height to 70 inches in height when treated weekly with water containing 0.02% by weight of the same sulfonates. Similar trees, treated with water alone, grew from 36 inches to 50 inches during the test period.

EXAMPLE V

Iris, treated weekly with water containing 0.02% by weight of the same sulfonate, grew 36 inches in height, while similar iris, receiving water alone, averaged 14 inches in height. The flower of the treated iris was 4 inches in length or double the size of the untreated iris.

EXAMPLE VI

Rhubarb plants, treated once with water containing 0.02% by weight of the same sulfonate, gave forth new growth which produced leaves averaging 26 inches in 30 days, while similar rhubarb plants receiving water alone, gave no new growth.

EXAMPLE VII 1200 black valentine bush beans were planted on October 10. The planted beans were divided into 4 equal portions, the soil in which 3 of the portions were planted being treated with the $C_{12}$ alkyl benzene sulfonate in concentrations of 15, 25 and 50 lbs./acre, respectively, while the remaining portion was untreated and constituted the blank for comparative purposes. The seeds were maintained at room temperature and from time to time by observation a determination was made of the total number of beans in each of the 4 portions which had germinated at that time, from which per cent germination was calculated. The results are given in the following table.

*Percent germination*

| Date | Untreated | 15 lbs./acre | 25 lbs./acre | 50 lbs./acre |
|---|---|---|---|---|
| Oct. 10 | 0.0 | 0.0 | 0.0 | 0.0 |
| Oct. 19 | 3.0 | 10.0 | 9.3 | 11.0 |
| Oct. 21 | 19.0 | 51.3 | 44.3 | 43.0 |
| Oct. 22 | 28.0 | 59.0 | 54.3 | 55.0 |
| Oct. 23 | 34.7 | 65.7 | 64.3 | 69.3 |
| Oct. 25 | 43.0 | 76.0 | 76.3 | 81.3 |
| Oct. 26 | 46.7 | 77.7 | 79.3 | 84.3 |
| Oct. 27 | 48.0 | 81.0 | 81.3 | 86.0 |

From the table it will be seen that alkyl benzene sulfonates applied to soil in accordance with this invention greatly enhance both the rate and completeness of germination of seeds.

In the treatment of soils in accordance with the present invention, it appears that irrigation or watering of vegetation, particularly plants, with water containing alkyl benzene sulfonate should not be carried out more often than about once a week to avoid over-stimulation, and that such irrigation should not be employed during the fruiting season unless the amount of water is reduced by two-thirds, otherwise the yield of fruit may be decreased due to the plant producing foliage rather than fruit.

The following examples are given to demonstrate the increased rate and extent of penetration of soils by water treatment, in accordance with this invention, with an alkyl benzene sulfonate. The same sulfonate is employed in these examples as in the preceding examples.

EXAMPLE VIII

In this example tests were made to compare the amount of water penetration for untreated soil and for identical soil treated with the sulfonate in a concentration of 25 lbs./acre. A vertically maintained glass tube 3½ inches in diameter was provided at its lower end with a wire screen of sufficiently fine mesh so that soil may be retained therein. Soil, in this example, sandy loam, having a free moisture content of 11.8% by weight was packed into the tube to a height of 10 inches and to a density of 1.248 grams per milliliter. The upper surface of the soil sample was so formed as to possess a slope 0.25 vertical inches per horizontal foot. An atomizer or sprayer was provided above the soil surface for spraying water thereon at a desired rate, in this case 3.50 inches per hour. A side tube or arm was formed in the vertical tube adjacent the lowest point of the soil surface, whereby water running off the soil without penetrating it could be collected and subsequently measured. The above apparatus simulates a 10 inch layer of soil overlying a highly porous subsoil.

The amount of water penetrating the soil for various amounts of water sprayed thereon (referred to as rainfall) was determined by measuring the amount of water passing out of the side arm and subtracting that volume from the volume of rainfall. The tube was repacked with fresh soil; the sulfonate was applied to the surface in an amount of 25 lbs./acre; and the penetration determinations repeated. In Figure 1 are shown curves of the relationship of water penetration of the soil (expressed as percent) and total inches of rainfall (water sprayed) for untreated soil and for soil treated with the $C_{12}$ alkyl benzene sodium sulfonate.

Referring to the curve in Figure 1 for untreated soil, it will be seen that the initial water which fell on the dry soil was completely absorbed. After the soil surface became wetted, only a part of the water was absorbed, the remainder running off the surface. As additional water was applied, the amount absorbed gradually decreased until the soil was wetted throughout its entire depth at which time only 28.5% of the water being applied was absorbed. The proportion of water absorbed remained the same during further spraying of water on the soil. In the case of the treated soil even after the surface was wetted the soil continued for some time to absorb all the water. When the entire depth of the soil was wetted, 95.1% of the water added to the surface thereafter continued to be absorbed.

It is thus seen that once the soil is fully wetted, water will continue to be absorbed at a constant rate as long as the water which penetrates the soil can flow through a porous subsoil, and in the present case such rate for soil treated in accordance with the present invention was 3.33 times that for the untreated soil. When such process is applied to a large area on a commercial scale, as a result of the diminished water flow across the surface of the soil, soil erosion, if it exists, may be greatly reduced or substantially eliminated.

EXAMPLE IX

In this example, the relationship between water penetration after complete wetting of the soil and rate of water application to the soil (simulated rainfall) for both the untreated and treated sandy loam soil is illustrated. By the procedure of Example VIII constant water penetrations, which are reached after complete wetting of soil, were determined for varying water flow (rainfall) rates in the case of untreated soil. This was repeated for soil treated with 25 lbs./acre of $C_{12}$ alkyl benzene sodium sulfonate, in accordance with this invention. The results are shown in Figure 2 which consists of curves of the relationship of water penetration of soil (expressed as per cent) and rate of rainfall in inches per hour, for both untreated and treated soil.

From an examination of the curves of Figure 2 it will be seen that in the case of untreated soil at very low rates of rainfall all the water penetrates the soil, but as the rate of water application increases, water absorption rapidly decreases. In contrast thereto, where the soil is treated with the sulfonate all water applied to the surface is absorbed up to a rate of 3.2 inches of water per hour. For higher rates of rainfall, treated soil absorbed about 3.8 times that of untreated soil. Thus, the process of the present invention is particularly applicable to arid areas experiencing little rainfall but where rain falls at abnormal rates when it does occur, since the soil will absorb and retain a much greater amount of the scarce water than if untreated.

EXAMPLE X

In the previous examples the tests were run on sandy loam soil; however, penetration of soil by water is dependent upon the nature of the soil. To illustrate, the procedure of Example IX was repeated on untreated samples of a high clay soil and also on such soil treated with the same amount of alkyl benzene sulfonate to determine the relationship of water penetration of high clay soil and rate of water flow. The results are shown in Figure 3 which comprises curves showing such relationship for both the untreated and treated soil.

As would be expected, water penetrates a sandy loam soil much better than a high clay soil, as will be seen by comparison of the curves of Figures 2 and 3. Further, in the case of the untreated high clay soil, water penetration decreases very rapidly with increased water application rate, and at 3.49 inches of rain per hour substantially no water penetrates the clay. In contrast thereto, the water penetration of the treated high clay soil decreases much slower with increase in water rate, and at 4.00 inches of water per hour 59% of the water still penetrated the soil. It will be noted that treatment with the alkyl benzene sulfonate resulted in 100% water penetration of the high clay soil at 0.5 inch of water per hour as compared with 49% water penetration for the untreated soil.

EXAMPLE XI

For the purpose of showing the effect of alkyl benzene sulfonate concentration (lbs./acre) on soil, a sample of untreated sandy loam was saturated with water by applying water to the surface thereof at a rate of 2.00 inches per hour and then the constant water penetration, attained after saturation of the soil with water, was determined, in accordance with the procedure hereinbefore described. Then, using a fresh sample of the untreated sandy loam, this procedure was repeated except that after the soil was saturated with water a quantity of the $C_{12}$ alkyl benzene sulfonate was applied to the surface of the soil, and immediately thereafter a determination was made of the water penetration of the soil so treated. A series of such runs were made using various concentrations (lbs./acre) of the sulfonate to show the relation between sulfonate concentration and water penetration. The entire procedure then was repeated using a subsoil, and the results are presented in Figure 4 which shows the relationship of water penetration to concentration of sulfonate (lbs./acre) for both the sandy loam soil and the subsoil. By examination of Figure 4, it will be seen that 25 lbs./acre of the sulfonate was sufficient to obtain 100% penetration of the sandy loam soil at 2.00 inches of water per hour, as compared with 50 lbs./acre required for a maximum water penetration for the subsoil of 45.3%.

From Figure 4, it will be seen also that the amount of the alkyl benzene sulfonate required for maximum water penetration at a given rate of water flow is dependent upon the type of soil involved. Thus, as would be expected, a higher concentration is necessary in the case of subsoil or other dense soil, such as high clay soil, than for a loose soil, such as sandy loam.

Obviously, water penetrating the soil has the tendency to leach out some of the alkyl benzene sulfonate and thereby gradually reduce the effectiveness of an application of the sulfonate. It has been found, however, that the rate of leaching of the sulfonate is relatively slow, and depending upon the amount of rainfall in a given area, it may be necessary to treat the soil with the sulfonate only once or twice a year.

EXAMPLE XII

In accordance with procedure hereinbefore described a sample of sandy loam soil was treated with a concentration of 25 lbs./acre of $C_{12}$ alkyl benzene sulfonate, which had been made radioactive, and water was sprayed thereon at an instantaneous rate equal the maximum rate possible for 100% penetration. The water passing through the soil was collected and tested electronically from time to time to determine the amount of sulfonate which had been leached out of the soil. The amount of the sulfonate remaining in the soil was then determined by difference between the original amount applied and the amount leached out. The results obtained are set forth in Figures 5 and 6 of the attached drawings.

Figure 5 is a curve of the relationship of the weight of unleached sulfonates expressed in pounds per acre and total inches of water applied to the soil. It will be seen from the curve that even after 16 inches of water have been applied to the soil, 21 pounds per acre of the sulfonate still remain in the soil. It further will be seen that after a total of 40 inches of water only 59.2 per cent of the sulfonate has been leached out.

Figure 6 is a curve illustrating the relationship of the maximum rate of water application for 100% penetration expressed in inches per hour and total inches of water applied. From Figure 6 it will be seen that the soil is still capable of absorbing 100 per cent of the water applied thereto up to a rate of more than 1.5 inches per hour after a total of 20 inches has been applied thereto and up to a rate of 0.70 inch per hour after a total of 40 minutes.

I claim:

1. A process for treating soil to enhance the water penetration and retention characteristics thereof and to stimulate the growth of vegetation, which comprises applying to said soil an alkyl benzene sulfonate having from 9 to 15 carbon atoms in the alkyl group.

2. A process for treating soil to enhance the water penetration and retention characteristics thereof and to stimulate the growth of vegetation, which comprises applying to said soil dodecyl benzene sulfonate.

3. A process for treating soil to enhance the water penetration and retention characteristics thereof and to stimulate the growth of vegetation, which comprises applying to said soil an alkyl benzene sulfonate having from 9 to 15 carbon atoms in the alkyl group at a rate of at least 10 pounds per acre of said sulfonate.

4. A process for treating soil to enhance the water penetration and retention characteristics thereof and to stimulate the growth of vegetation, which comprises applying to said soil an alkyl benzene sulfonate having from 9 to 15 carbon atoms in the alkyl group at a rate of from 15 to 50 pounds per acre of said sulfonate.

5. A process for treating soil to enhance the water penetration and retention characteristics thereof and to stimulate the growth of vegetation, which comprises applying to said soil dodecyl benzene sulfonate at a rate of from 15 to 50 pounds per acre of said sulfonate.

6. A process for treating soil which comprises contacting the soil with water containing from 0.01 per cent to 0.15 per cent of an alkyl benzene sulfonate having from 9 to 15 carbon atoms in the alkyl group.

7. A process for treating soil which comprises contacting the soil with water containing from 0.01 per cent to 0.15 per cent of dodecyl benzene sulfonate.

8. A process for treating soil to enhance the water penetration and retention characteristics thereof and to stimulate the growth of vegetation, which comprises applying to the soil a mixture of an alkyl benzene sulfonate having from 9 to 15 carbon atoms in the alkyl group and a minor proportion of a lower molecular weight alkyl benzene sulfonate.

9. A process for treating soil to enhance the water penetration and retention characteristics thereof and to stimulate the growth of vegetation, which comprises applying to the soil a mixture of an alkyl benzene sulfonate having from 9 to 15 carbon atoms in the alkyl group and a minor proportion of xylene sulfonate.

10. A process for treating soil to enhance the water penetration and retention characteristics thereof and to stimulate the growth of vegetation, which comprises applying to the soil a mixture of dodecyl benzene sulfonate and xylene sulfonate.

References Cited in the file of this patent

UNITED STATES PATENTS

| Number | Name | Date |
|---|---|---|
| 2,218,695 | Leatherman | Oct. 22, 1940 |
| 2,222,735 | Bancroft et al. | Nov. 26, 1940 |
| 2,222,736 | Bancroft et al. | Nov. 26, 1940 |
| 2,222,737 | Bancroft et al. | Nov. 26, 1940 |
| 2,222,738 | Bancroft et al. | Nov. 26, 1940 |
| 2,247,365 | Flett | July 1, 1941 |
| 2,284,002 | Lontz | May 26, 1942 |
| 2,320,060 | Barlow | May 25, 1943 |
| 2,350,709 | Adams et al. | June 6, 1944 |
| 2,614,917 | Zukel et al. | Oct. 21, 1952 |
| 2,624,662 | Erickson et al. | Jan. 6, 1953 |

FOREIGN PATENTS

| Number | Country | Date |
|---|---|---|
| 9,881 | Australia | of 1907 |